US008185556B2

(12) United States Patent
Perkins et al.

(10) Patent No.: US 8,185,556 B2
(45) Date of Patent: *May 22, 2012

(54) COMPUTER-IMPLEMENTED PROCESSING OF HETROGENEOUS DATA

(75) Inventors: Peter C. Perkins, Natick, MA (US); Thomas P. Lane, Carlisle, MA (US)

(73) Assignee: The MathWorks, Inc., Natick, MA (US)

( * ) Notice: Subject to any disclaimer, the term of this patent is extended or adjusted under 35 U.S.C. 154(b) by 1473 days.

This patent is subject to a terminal disclaimer.

(21) Appl. No.: 11/518,151

(22) Filed: Sep. 11, 2006

(65) Prior Publication Data

US 2008/0065585 A1 Mar. 13, 2008

(51) Int. Cl.
*G06F 17/30* (2006.01)
(52) U.S. Cl. .................. 707/793; 707/803
(58) Field of Classification Search .............. 707/755, 707/756, 793, 803
See application file for complete search history.

(56) References Cited

U.S. PATENT DOCUMENTS

| 2005/0060372 | A1* | 3/2005 | DeBettencourt et al. ..... 709/206 |
| 2007/0006139 | A1* | 1/2007 | Rubin et al. ................. 717/106 |
| 2007/0028076 | A1 | 2/2007 | Wezelenburg |
| 2007/0083495 | A1* | 4/2007 | Dettinger et al. ................ 707/3 |
| 2007/0085714 | A1* | 4/2007 | Levy ............................. 341/51 |
| 2007/0130172 | A1 | 6/2007 | Lee |

OTHER PUBLICATIONS

U.S. Appl. No. 11/892,398, Perkins et al.
W. N. Venables et al., An Introduction to R, Notes on R: A Programming Environment for Data Analysis and Graphics, Version 1.9.1 (Jun. 21, 2004), available at http://voteview.com/R-intro.pdf.
R Development Core Team, *R Language Definition*, Draft, Version 1.8.1 (Nov. 21, 2003).
MATLAB Function Reference cell, retrieved from http://www.mathwords.com/access/helpdesk/help/techndoc/ref/cell.html [last retrieved on Jul. 15, 2006].
MATLAB Function Reference cell2struct, retrieved from http://www.mathworks.com/access/helpdesk/help/techdoc/ref/cell2struct.html [last retrieved on Jul. 15, 2006].
MATLAB Function Reference celldisp, retrieved from http://www.mathworks.com/access/helpdesk/help/techdoc/ref/celldisp.html [last retrieved on Jul. 15, 2006].

(Continued)

*Primary Examiner* — John E Breene
*Assistant Examiner* — Dennis Myint
(74) *Attorney, Agent, or Firm* — Venable LLP; Michael A. Sartori; Christopher Ma (57) ABSTRACT

A computer-implemented method for a computing environment employing a matrix-based mathematical programming language includes: generating a heterogeneous dataset in the computing environment, where the heterogeneous dataset embodies a plurality of variables for a plurality of subjects, where each element of a respective variable has a same data type, where the variables comprise at least two data types; accessing contents of the heterogeneous dataset with a single command in the computing environment, where the single command is a brace command, a dot command, or a parentheses command; and providing in the computing environment a portion of the heterogeneous dataset based on the single command.

50 Claims, 7 Drawing Sheets

OTHER PUBLICATIONS

MATLAB Function Reference iscell, retrieved from http://www.mathworks.com/access/helpdesk/help/techdoc/ref/iscell.html [last retrieved on Jul. 15, 2006].

DataSet Standard Data Object for use with MATLAB, retrieved from http://software.eigenvector.com/DataSet/index.html [last retrieved on Aug. 29, 2006].

"The Spider Objects", retrieved from http://www.kyb.mpg.de/bs/people/spider/help_data.html [last retrieved on Aug. 29, 2006].

Author unknown; "DataSet: Standard Data Object"; version 4.01, (author unknown); EigenVector Research Incorporated: Manson, WA; pp. 1-46; Released Mar. 30, 2006.

* cited by examiner

|   |   |
|---|---|
| 1 | 2 |

'Tony'   3.0000+
         4.0000i

|   |   |
|---|---|
| 1 | 2 |
| 3 | 4 |

-5    'abc'

PRIOR ART

FIG. 1

| Patient | Age | BloodPressure | Allergic |
|---------|-----|---------------|----------|
| 'Jim' | 43 | [110 90] | no |
| 'Michael' | 41 | [120 80] | no |
| 'Peter' | 47 | [105 75] | yes |
| 'Tom' | 48 | [125 88] | yes |

202 → Patient column; 203 → Age; 201 → table

| | data1 | | color | score | TestSet | |
|---|---|---|---|---|---|---|
| bob | 1 | 2 | 'green' | -6 | 13 | 'tree' |
| | 3 | 4 | | | | |
| jane | 4 | 6 | 'green' | 25 | 5 | 'foot' |
| | 8 | 7 | | | | |
| lauren | 10 | 2 | 'red' | 23.8 | 84 | 'air' |
| | 1 | 3 | | | | |
| colin | 3 | 3 | 'yellow' | 14 | 3 | 'paul' |
| | 5 | 6 | | | | |
| diane | 9 | 4 | 'green' | 35.62 | 1 | 'miami' |
| | 2 | 6 | | | | |

COMPUTER-IMPLEMENTED PROCESSING OF HETROGENEOUS DATA

FIELD OF THE INVENTION

The present invention relates generally to computer-implemented processing of heterogeneous data.

BACKGROUND OF THE INVENTION

Conventional computing environments employing a matrix-based mathematical programming language (e.g., MATLAB® software by The MathWorks, Inc. of Natick, Mass.) operate on numeric arrays of vectors and matrices, character arrays, and cell arrays. Both numeric arrays and character arrays must include only homogeneous data. Cell arrays, however, may include heterogeneous data and can include any type of data supported by the data processing software, such as, for example: logical data, character data, various types of numeric data (e.g., numeric scalar data and numeric arrays), other cell arrays, structures, java classes, function handles, and any new data types created using an object-oriented class definition (e.g., any new data types created using a MATLAB object system, such as, for example, MATLAB oops, uud, and mcos object systems).

Figure 1:
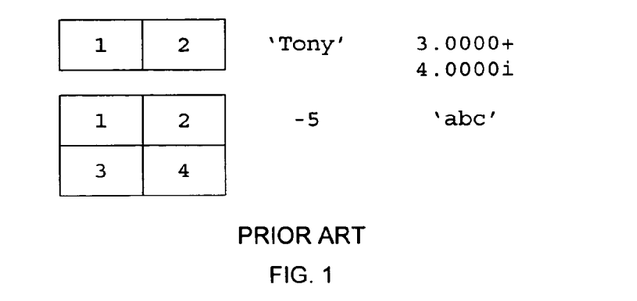
FIG. 1 depicts an exemplary prior art cell array.

FIG. 1 illustrates an exemplary prior art cell array. The cell array depicted in FIG. 1 is defined and displayed using the following pseudocode:

```
>> cellarray1 = {[1 2] 'Tony' 3+4i; [1 2;3 4] -5 'abc'};
>> celldisp(cellarray1)
```

To obtain values in a cell array C, the following pseudocode command is used:

C{r, c} where r is the row number and c is the column number. Continuing the example, to obtain values in the cell array of FIG. 1, the following pseudocode commands may be used:

```
>>cellarray1{1,1}
ans =
    1   2
>>cellarray1{2,1}
ans =
    1   2
    3   4
>>cellarray1{1,2}
ans =
    'Tony'
>>cellarray1{2,2}
ans =
    -5
>>cellarray1{1,3}
ans =
    3.0000+ 4.0000i
>>cellarray1{2,3}
ans =
    'abc'
```

Statistical datasets often have a structure that is not as homogeneous as a purely numeric array, but has more structure than a cell array. A typical statistical dataset may include a set of variables measured on a collection of subjects (also referred to as, for example, cases or observations). Such a statistical dataset may often be represented as a table with columns representing the variables and rows representing the subjects. An entry in such a table may be a scalar numeric value, a numeric array, a value chosen from some finite set (e.g., red, green, or blue), an arbitrary text string, or some other data type. Existing conventional computing environments employing a matrix-based mathematical programming language do not provide a convenient way for processing this type of statistical dataset.

SUMMARY OF THE INVENTION

In one exemplary embodiment, the invention may be a computer-implemented method for a computing environment employing a matrix-based mathematical programming language, the method comprising: generating a heterogeneous dataset in the computing environment, wherein the heterogeneous dataset embodies a plurality of variables for a plurality of subjects, wherein each element of a respective variable has a same data type, wherein the variables comprise at least two data types; accessing contents of the heterogeneous dataset with a single command in the computing environment, wherein the single command is based on at least one of: a command to access contents of the heterogeneous dataset for one of the variables and for one of the subjects, a command to access contents of the heterogeneous dataset for all subjects associated with one of the variables, or a command to access contents of the heterogeneous dataset for a portion of the plurality of the variables and for a portion of the plurality of the subjects; and providing in the computing environment a portion of the heterogeneous dataset based on the single command.

In another exemplary embodiment, the invention may be a computer-readable medium comprising software, which when executed by a computer system causes the computer system to perform operations in a computing environment employing a matrix-based mathematical programming language, the operations comprising: generating a heterogeneous dataset in the computing environment, wherein the heterogeneous dataset embodies a plurality of variables for a plurality of subjects, wherein each element of a respective variable has a same data type, wherein the variables comprise at least two data types; accessing contents of the heterogeneous dataset with a single command in the computing environment, wherein the single command is based on at least one of: a command to access contents of the heterogeneous dataset for one of the variables and for one of the subjects, a command to access contents of the heterogeneous dataset for all subjects associated with one of the variables, or a command to access contents of the heterogeneous dataset for a portion of the plurality of the variables and for a portion of the plurality of the subjects; and providing in the computing environment a portion of the heterogeneous dataset based on the single command.

In another exemplary embodiment, the invention may be a system for processing heterogeneous data in a computing environment employing a matrix-based mathematical programming language, comprising: means for generating a heterogeneous dataset in the computing environment, wherein the heterogeneous dataset embodies a plurality of variables for a plurality of subjects, wherein each element of a respective variable has a same data type, wherein the variables comprise at least two data types; means for accessing contents of the heterogeneous dataset with a single command in the computing environment, wherein the single command is based on at least one of: a command to access contents of the heterogeneous dataset for one of the variables and for one of the subjects, a command to access contents of the heterogeneous dataset for all subjects associated with one of the variables, or a command to access contents of the heterogeneous dataset for a portion of the plurality of the variables and for a portion of the plurality of the subjects; and means for providing in the computing environment a portion of the heterogeneous dataset based on the single command.

In another exemplary embodiment, the invention may be a computer-implemented method for a computing environment employing a matrix-based mathematical programming language, the method comprising: generating a dataset in the computing environment, wherein the dataset comprises a categorical array, wherein the categorical array is internally represented as a finite set of K text strings and a vector of N indices with values from 1 to K indicating one of the K text strings; accessing contents of the dataset with a command in the computing environment; and providing in the computing environment a portion of the categorical array based on the command.

In another exemplary embodiment, the invention may be a computer-readable medium comprising software, which when executed by a computer system causes the computer system to perform operations in a computing environment employing a matrix-based mathematical programming language, the operations comprising: generating a dataset in the computing environment, wherein the dataset comprises a categorical array, wherein the categorical array is internally represented as a finite set of K text strings and a vector of N indices with values from 1 to K indicating one of the K text strings; accessing contents of the dataset with a command in the computing environment; and providing in the computing environment a portion of the categorical array based on the command.

Further features of the invention, as well as the structure and operation of various embodiments of the invention, are described in detail below with reference to the accompanying drawings.

BRIEF DESCRIPTION OF THE DRAWINGS

The foregoing and other features of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

DEFINITIONS

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; application-specific hardware to emulate a computer and/or software, such as, for example, a digital signal processor (DSP), a field-programmable gate array (FPGA), a chip, chips, or a chip set; an optical computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; and a memory chip.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. Examples of a network may include: an internet, such as the Internet; an intranet; a local area network (LAN); a wide area network (WAN); and a combination of networks, such as an internet and an intranet.

DETAILED DESCRIPTION OF EMBODIMENTS OF THE PRESENT INVENTION

Exemplary embodiments of the invention are discussed in detail below. While specific exemplary embodiments are discussed, it should be understood that this is done for illustration purposes only. In describing and illustrating the exemplary embodiments, specific terminology is employed for the sake of clarity. However, the invention is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. Each reference cited herein is incorporated by reference. The examples and embodiments described herein are non-limiting examples.

An exemplary embodiment of the invention may be implemented with a computing environment employing a matrix-based mathematical programming language (e.g., MATLAB® software by The MathWorks, Inc. of Natick, Mass.).

Figure 2:
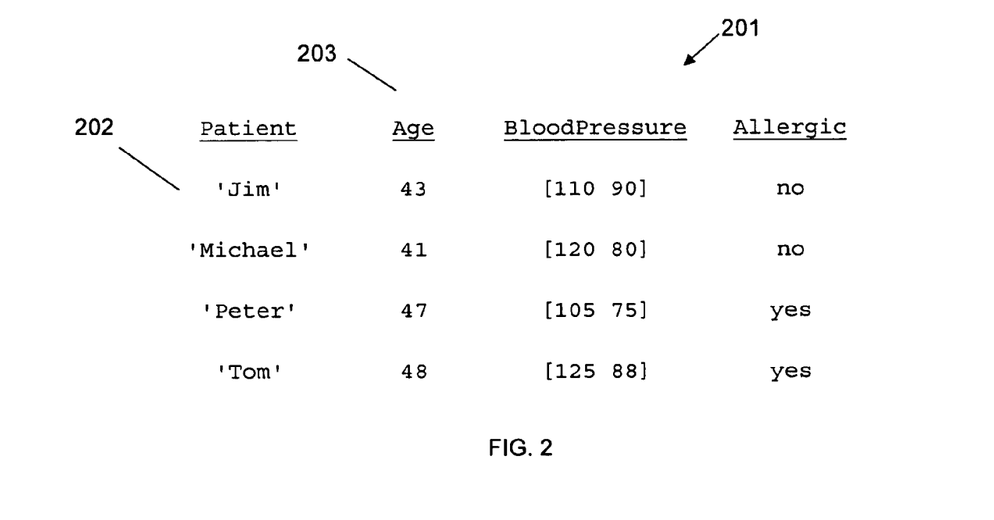
FIG. 2 depicts an exemplary dataset for an exemplary embodiment of the invention.

For an exemplary embodiment of the invention, a dataset may include heterogeneous data embodied as a set of variables over a set of subjects (referred to as, for example, cases or observations). The dataset may be measurements, statistical information, parameters, and/or information regarding one or more experiments. FIG. 2 depicts an exemplary dataset 201 for an exemplary embodiment of the invention. The dataset 201 may be depicted as matrix where the rows are the subjects 202 (e.g., Jim, Michael, Peter, and Tom) and the columns are variables 203 (e.g., patients, age, blood pressure, and allergic).

The dataset, for example, may be: provided by a user via input directly or indirectly to the computing environment; generated by conducting one or more experiments in the computing environment; acquired by directing one or more experiments external to the computing environment; and/or acquired by accessing information external to the computing environment from one or more other computers via a network.

Each variable of the dataset may have the same length, and each element in a variable may be of the same data type. If N is the number of subjects, each variable has length N along its first dimension. A single datum of the dataset is the value of a variable for a specific subject.

A variable may be any data type supported by the computing environment employing the matrix-based mathematical programming language. Examples of a variable may include: a logical array, a character array, a numeric array (e.g., a vector, a matrix, or a higher-dimensional numeric array), a cell array, a categorical array (discussed below), a time series object, an array of structures, an array of java classes, an array of function handles, and an array of any new data types created using an object-oriented class definition (e.g., any new data types created using a MATLAB object system, such as, for example, MATLAB oops, uud, and mcos object systems). Examples of data types for the variable that include numeric values include: a logical array, a numeric array, a cell array, and a time series object. Examples of data types for the variable that include non-numeric values include: a character array, a cell array, a categorical array, an array of structures, an array of java classes, an array of function handles, and an array of any new data types created using an object-oriented class definition.

An element of a variable is a single datum in the dataset and, as such, may be any type of data allowed in the array that defines the variable. For example, for a numeric vector variable, the element of the variable may be a scalar number. For a cell array variable, the element of the variable may be any data type permitted by the cell array. For other variables containing homogeneous data, the element of the variable may be whatever data type the variable requires, such as a logical value, a numeric array (e.g., a vector, matrix, or a higher-dimensional numeric array), a categorical value chosen from a finite set (e.g., red, green, or blue), or an arbitrary text string.

In an exemplary embodiment, such a dataset may be conveniently accessible in multiple ways. Let D be such a dataset having such a collection of variables, let var be a variable in the dataset D, and let subj be a subject in the dataset D. The variable var may be, for example, a collection of measurements of a specific quantity or statistics on the subjects of the dataset or a collection of text or numeric data that describe the measurements themselves or their parameters. Once accessed, the accessed portion of the dataset may be displayed and/or processed.

Figure 3:
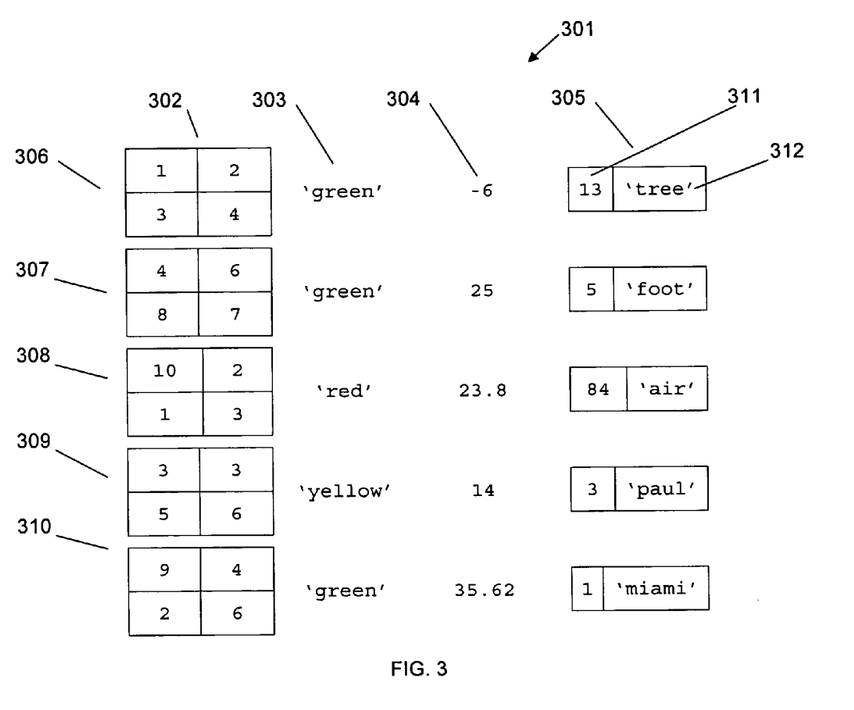
FIG. 3 depicts an exemplary dataset for an exemplary embodiment of the invention.

FIG. 3 depicts an exemplary dataset E 301 for an exemplary embodiment. The dataset has four variables 302-305 and five subjects 306-310. Each variable has the same length, namely five, and each element of a variable is the same data type. For example, the first variable 302 has a 2×2 numeric matrix data type for each element, the second variable 303 has a text string data type for each element, the third variable 304 has a numeric scalar data type for each element, and the fourth variable 305 has a 1×2 cell array data type for each element, where the first element 311 of each cell array is a numeric scalar data type and the second element 312 of each cell array is a text string data type.

To access data in the dataset in different ways, a variety of single commands may be used and are referred to as a brace command, a dot command, and a parentheses command. In the computing environment employing the matrix-based mathematical programming language, the single command may be used in a workspace in which variables are generated and processed. The single command may be entered into the workspace by a user directly or by a software program containing the single command (e.g., an M-file compatible with MATLAB). The computing environment employing the matrix-based mathematical programming language may accept these single commands.

The brace command obtains the contents of the dataset for a specific variable and for a specific subject. The following single pseudocode brace command provides a single observation (i.e., a single datum in the dataset) of a specific variable var and for a specific subject subj:

D{subj,var}

Applying the above single pseudocode brace command to the exemplary dataset illustrated in FIG. 3, the following results.

```
>>E{2,1}
ans =
    4   6
    7   8
>>E{4,2}
ans =
    'yellow'
```

The dot command obtains the contents of the dataset for all subjects for a specific variable. The following single pseudocode dot command provides observations of a specific variable var for all subjects in the dataset:

D.var

Because each element in the variable is of the same data type, all the observations obtained are also of the same data type. If the elements of the variable are homogeneous (e.g., each element is a numeric array), the data obtained are homogeneous. If the elements of the variable are heterogeneous (e.g., each element is a cell array), the data obtained are heterogeneous.

Applying the above single pseudocode dot command to the exemplary dataset illustrated in FIG. 3, the following results, where v3 is the name of the third variable.

```
>>E.v3
ans =
    -6
    25
    23.8
    14
    35.62
```

The parentheses command obtains the contents of the dataset for a number of specific variables and for a number of specific subjects. The result is another dataset, which is a subset of the dataset. The following single pseudocode parentheses command provides observations for a number of specific variables vars and for a number of specific subjects subjs in the dataset:

D (subjs, vars)

The resulting observations are a new dataset that is a subset of the original dataset. Depending on the type of data in the identified variables vars, the resulting subset may be homogeneous or heterogeneous.

Applying the above single pseudocode command to the exemplary dataset illustrated in FIG. 3, the following results.

```
>>E(4:5,2:4)
ans =
    'yellow'   14      {1×2 cell}
    'green'    35.62   {1×2 cell}
```

In this example, the above pseudocode command does not provide the contents of the cell array and, instead, indicates that the requested data is a cell array of a particular size.

In an alternative exemplary embodiment, the single pseudocode parentheses command may provide the contents of a cell array. For example, applying the above single pseudocode command to the exemplary dataset illustrated in FIG. 3, the following results.

```
>>E(4:5,2:4)
ans =
    'yellow'   14      {3    'paul'}
    'green'    35.62   {1    'miami'}
```

The three single commands of brace, dot, and parentheses may be combined as well. For example, combining the dot and parentheses commands, the following single pseudocode command provides observations of a specific variable var for a number of identified subjects subjs in the dataset:

D.var(subjs)

Applying the above single pseudocode command to the exemplary dataset illustrated in FIG. 3, the following results, where v3 is the name of the third variable.

```
>>E.v3(2:4) =
    25
    23.8
    14
```

As another example, combining the brace and dot commands, the following single pseudocode command provides observations of a specific variable var for a number of identified subjects subjs in the dataset:

D.var{subj}

Applying the above single pseudocode command to the exemplary dataset illustrated in FIG. 3, the following single command obtains in a single step the value of the third observation of the cell array of the fourth variable, where v4 refers to the fourth variable.

```
>>E.v4{3}
ans =
    {1×2 cell}
```

In this example, the above pseudocode command does not provide the contents of the cell array and, instead, indicates that the requested data is a cell array of a particular size.

In an alternative exemplary embodiment, the single pseudocode command may provide the contents of a cell array. For example, applying the above single pseudocode command to the exemplary dataset illustrated in FIG. 3, the following results.

```
>>E.v4{3}
ans =
    {84   'air'}
```

As another example, combining the brace and parentheses commands, the following single pseudocode command provides observations for a number of rows rows and a number of columns cols of a specified variable var for a specific subject subj in the dataset:

D {subj,var} (rows, cols)

Applying the above single pseudocode command to the exemplary dataset illustrated in FIG. 3, the following obtains in a single step the values of the third observation of both columns of the second row for the matrix of the first variable, where v1 refers to the first variable.

```
>>E{3, 'v1'}(2,1:2)
ans =
    1    3
```

As another example, combining the brace, dot, and parentheses commands, the following single pseudocode command provides observations for a number of rows rows and a number of columns cols of a specific variable var for a specific subjects subj in the dataset:

D.var{subj} {rows,cols}

Applying the above single pseudocode command to the exemplary dataset illustrated in FIG. 3, the following obtains in a single step the first variable (where v1 is the name of the first variable), obtains the value for the third subject, and obtains both columns of the second row of the result.

```
>>E.v1{3}(2,1:2)
ans =
    1    3
```

Figure 4:
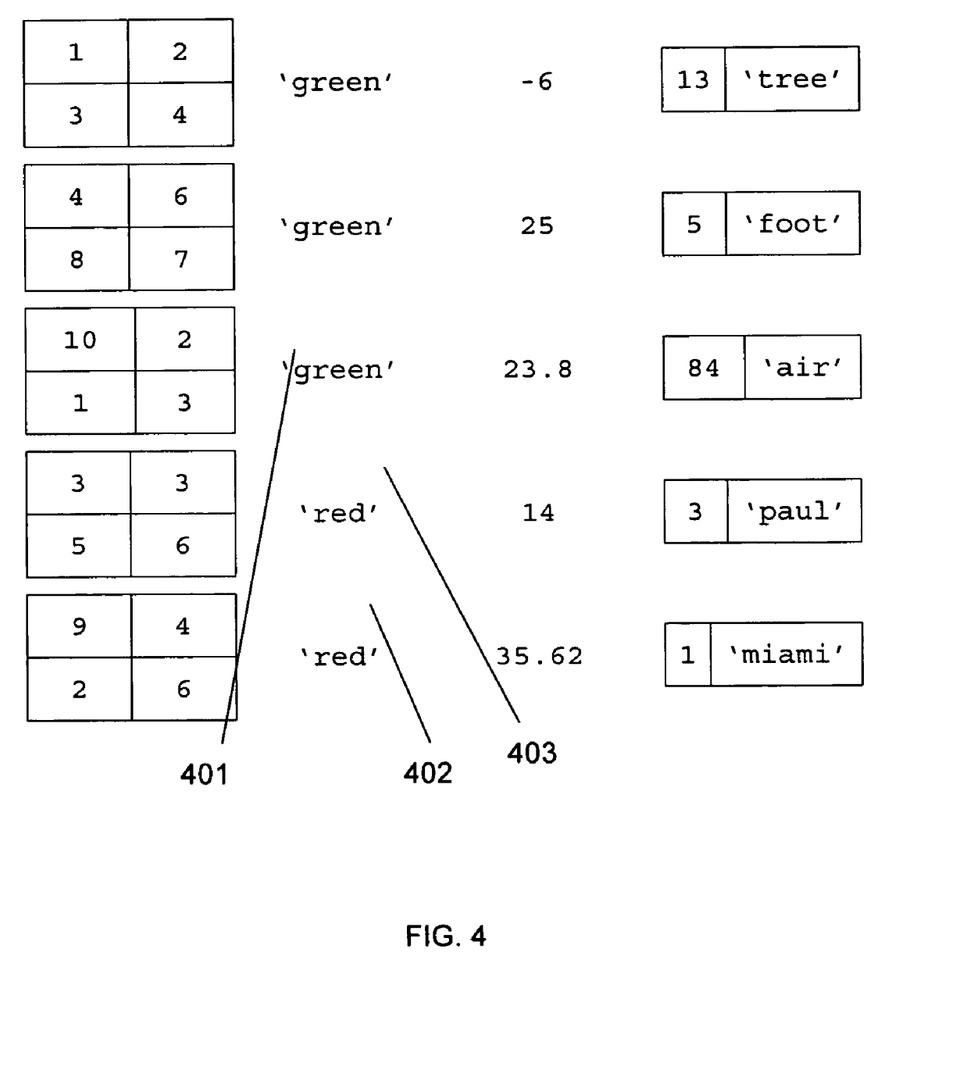
FIG. 4 depicts an exemplary dataset for an exemplary embodiment of the invention.

The single pseudocode commands may be used to extract data from the dataset (as shown in the examples above). Further, each of the above single pseudocode commands may be used to assign data into a dataset. For example, referring to the exemplary dataset in FIG. 3, to change data in the second variable, the following pseudocode may be used:

>>E.v2(3:5)={'green'; 'red'; 'red'};

With this command, the exemplary dataset depicted in FIG. 4 results, where elements 401, 402, and 403 are changed.

With the invention, optional subject names and variable names may be assigned to the dataset. An array of text or a cell array containing multiple subject names (or subject numbers, even if the subjects do not have any natural numeric ordering) may be assigned to the dataset. Likewise, an array of text or a cell array containing multiple variable names (or variable numbers, even if the variables do not have any natural numeric ordering) may be assigned to the dataset.

As to subject names for the dataset, the following single pseudocode command assigns subject names to the dataset:

set(D,'obsnames',snames)

where snames is a character array or a cell array.

Applying the above pseudocode command, exemplary subject names may be assigned to the dataset illustrated in FIG. 3 as follows:

```
>>subjectnames1 = {'bob'; 'jane'; 'lauren'; 'colin'; 'diane'};
>>E = set(E,'obsnames',subjectnames1)
```

As to variable names for the dataset, the following single pseudocode command assigns variable names to the dataset:

D=set(D,'varnames',vnames)

where vnames is a character array or a cell array.

Applying the above pseudocode command, exemplary variable names may be assigned to the dataset illustrated in FIG. 3 as follows:

```
>>variablenames1 = {'data1'; 'color'; 'score'; 'TestSet'};
>>E = set(E,'varnames',variablenames1)
```

Figure 5:
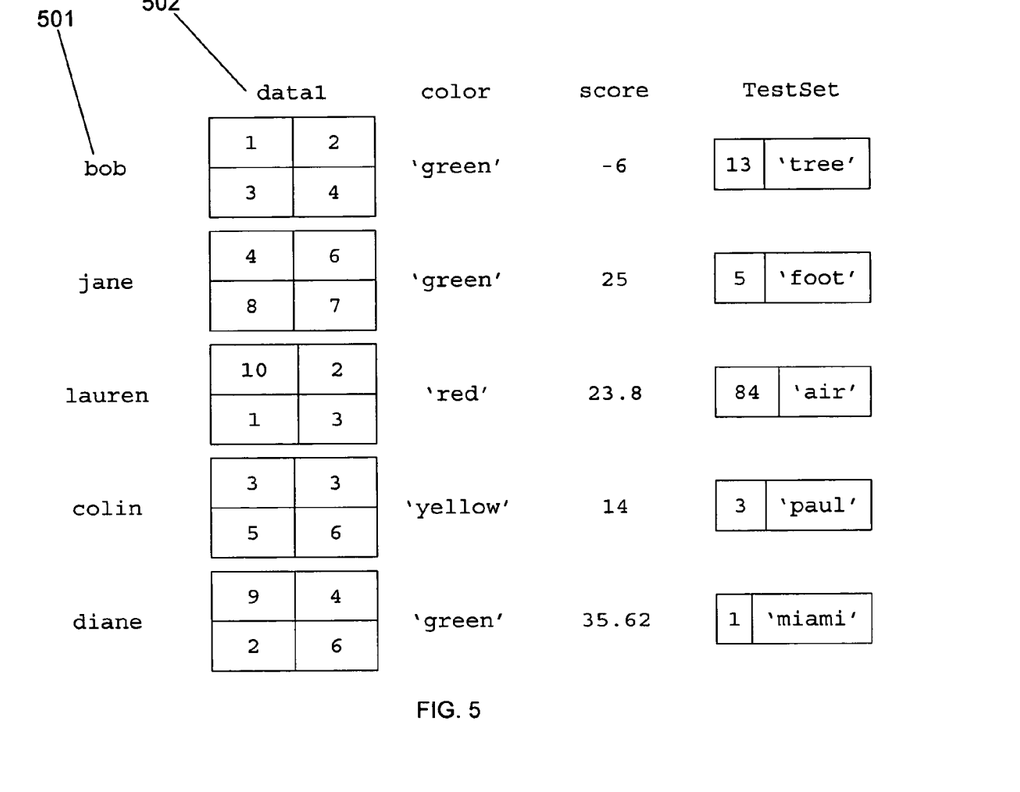
FIG. 5 depicts an exemplary dataset for an exemplary embodiment of the invention.

The resulting dataset with subject names and variable names is illustrated in FIG. 5, which includes subject names 501 and variable names 502.

To display a dataset including the data as well as any variable names and subject (or observation) names, the following pseudocode commands may be used:

D display (D)

Continuing the above example, the dataset E may be displayed along with the subject names and variable names as follows:

```
>> E
>> display(E)
E =
           data1          color      score    TestSet
    bob    [2×2 double]   'green'      -6     {1×2 cell}
    jane   [2×2 double]   'green'      25     {1×2 cell}
    lauren [2×2 double]   'red'        23.8   {1×2 cell}
    colin  [2×2 double]   'yellow'     14     {1×2 cell}
    diane  [2×2 double]   'green'      35.62  {1×2 cell}
```

In addition to displaying the data in the dataset, a statistical summary of the dataset may be obtained using the following pseudocode command:

summary (D)

Examples of information provided by the statistical summary may include: minimum, first quartile, median, third quartile, maximum, variance, and standard deviation.

Continuing the above example, a statistical summary of the dataset E may be displayed as follows:

```
>> summary(E)
data1: [5×1 cell]
color: [5×1 string]
score: [5×1 double]
    min    1st Q    median    3rd Q     max
    -6        9    23.8000   27.6550  35.6200
TestSet: [5×1 cell]
```

As another example, a modified version of the dataset E1 may be created by removing the data1 variable, TestSet variables, and the subject names from the dataset E, and then adding a patient name variable (i.e., the patient variable), a nominal variable (i.e., the answer variable), an ordinal variable (i.e., the pref variable). The following results from the using the display and summary pseudocode commands:

```
>> display(E)
E =
       patient    color       score    answer    pref
       bob       'green'       -6      yes       low
       jane      'green'        25     no        high
       lauren    'red'          23.8   no        med
       colin     'yellow'       14     yes       high
       diane     'green'        35.62  yes       low
>> summary(E)
patient: [5×1 string]
color: [5×1 string]
score: [5×1 double]
    min    1st Q    median    3rd Q     max
    -6        9    23.8000   27.6550  35.6200
answer: [5×1 nominal]
    no    yes    <undefined>
    2      3          0
pref: [5×1 ordinal]
    low    med    high    <undefined>
    2       1      2           0
```

In obtaining statistical datasets, category information may be part of the data collected from the measurements made. The category information may fall into one of several different categories, and each subject may have an entry corresponding to one of the categories. In an exemplary embodiment of the invention, a categorical array may be used to capture this type of data. A categorical array may include text string data from a finite set of K text strings (i.e., the category information). The internal representation of the categorical array may include a collection of the K text strings indicating the finite set and a vector of N indices from 1 to K indicating the value for each respective subject. The display of the categorical array may be similar to the display of a single-column array of N text strings, but without quotes around the strings. If K<N, at least one of the text strings will be repeated in the categorical array. By using the internal representation of the set of K text strings and the numerical array of N elements, a reduction in storage may be obtained, and/or certain computations may be easier to implement.

As an example, the character string variable in the second column of the exemplary dataset of FIG. 3 may be replaced with a categorical array variable. The following pseudocode performs this replacement and displays the resulting dataset.

```
>>cat_array = {'green'; 'green'; 'red'; 'yellow'; 'green'};
>>E.color = categorical(cat_array);
```

Figure 6:
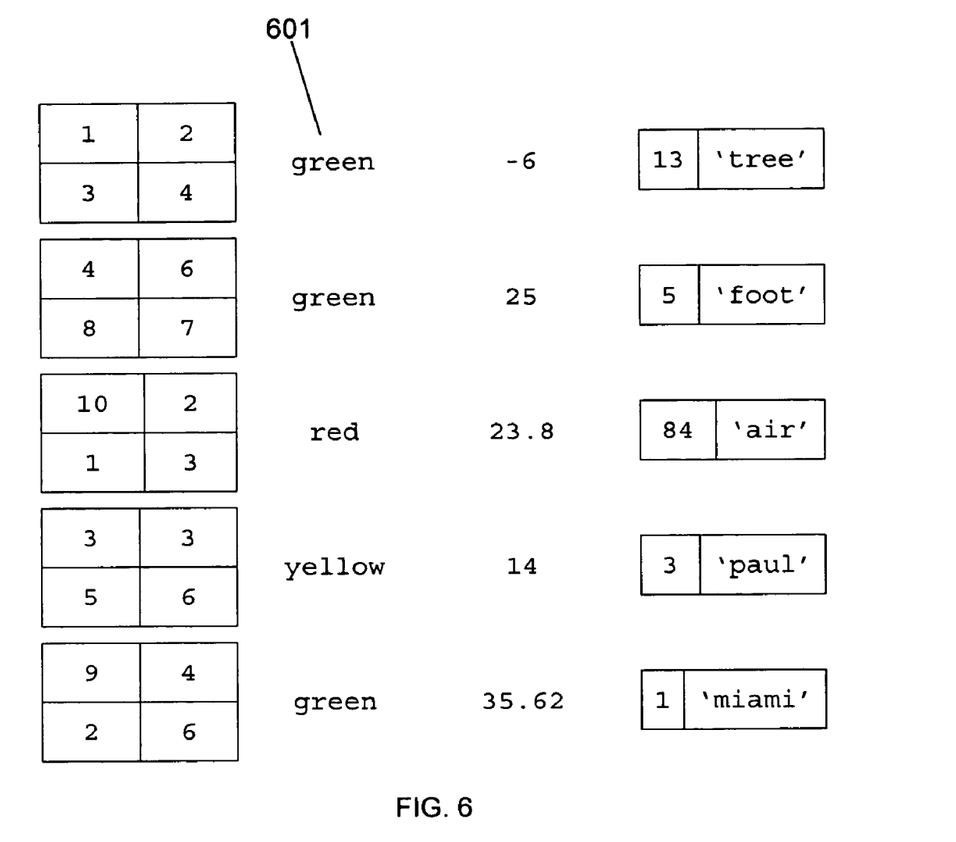
FIG. 6 depicts an exemplary dataset for an exemplary embodiment of the invention.

The display of the exemplary dataset E is depicted in FIG. 6, which includes the categorical array variable 601. In this exemplary embodiment, the lack of quotes around text indicates a categorical variable. Hence, FIG. 6 is the same as FIG. 3, except the quotations are not present for the elements in the second column (i.e., the replaced column).

Further, an equal operation (e.g., pseudocode command of ==) and an unequal operation (e.g., pseudocode command of ~=) may be performed by comparing a categorical array variable to a text string, which provides a simple syntax for creating a logical index into a dataset. Compared to a cell array, a cell array can not be compared with a text string, and a cell array does not require that its elements be from a finite set.

Continuing with the above example, to compare the character string variable of the exemplary dataset, the following pseudocode may be used:

>>A=(E.color=='green')

The resulting vector A has values of 1 for true and 0 for false, based on the comparison, and may be displayed as follows:

```
>>disp(A)
ans =
   1
   1
   0
   0
   1
```

In addition, for the categorical array, an ordinal object may be added as a subclass of the categorical object. With the ordinal object, the categories in the categorical array may be ordered. This ordinal object may be suitable for use with values for the categorical array having a natural order (e.g., low, medium, and high; or hot, warm, cool, and cold). With the ordinal objects, comparison operations using <, <=, >, and >= may be added to the equal and not equal operations discussed above for categorical objects.

As an example, a character string variable is added to the dataset of FIG. 3 as a fifth column, and a comparison is made based on this addition. The pseudocode for processing and displaying the data is as follows:

```
>>vlabels = {'low'; 'low'; 'high'; 'medium'; 'high'};
>>labelorder = {'low; 'medium'; 'high'};
>>E.v5 = categorical(vlabels, labelorder);
>>A = (E.v5 > 'low')
>>disp(A)
ans =
   0
   0
   1
   1
   1
```

Figure 7:
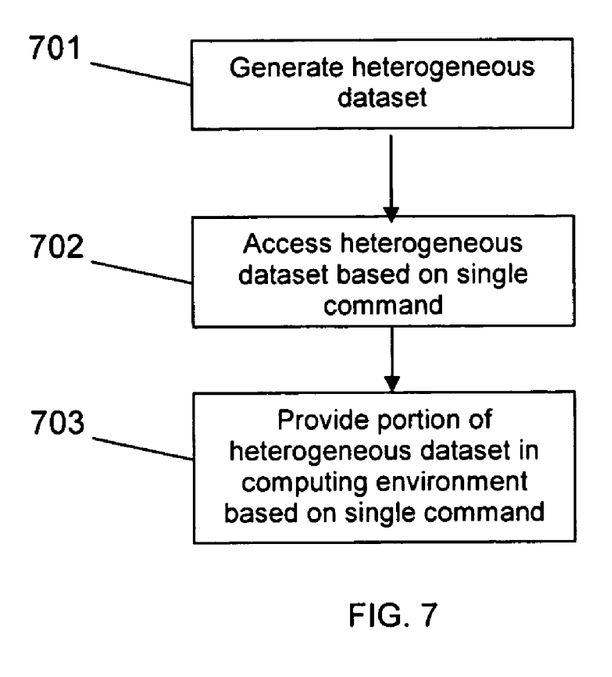
FIG. 7 depicts a flow chart for an exemplary embodiment of the invention.

FIG. 7 depicts a flow chart for an exemplary embodiment of the invention. In block 701, a heterogeneous dataset may be generated in the computing environment. The heterogeneous dataset may include a number of variables for a number of subjects. Each element of a respective variable may have a same data type. The variables may include at least two data types, where at least one of the variables includes a non-numeric data type.

In block 702, contents of the heterogeneous dataset may be accessed with a single command in the computing environment. The single command may be the brace command, the dot command, or the parentheses command.

In block 703, a portion of the heterogeneous dataset may be provided in the computing environment based on the single command. The provided portion of the heterogeneous dataset may be some or all of the heterogeneous dataset.

Figure 8:
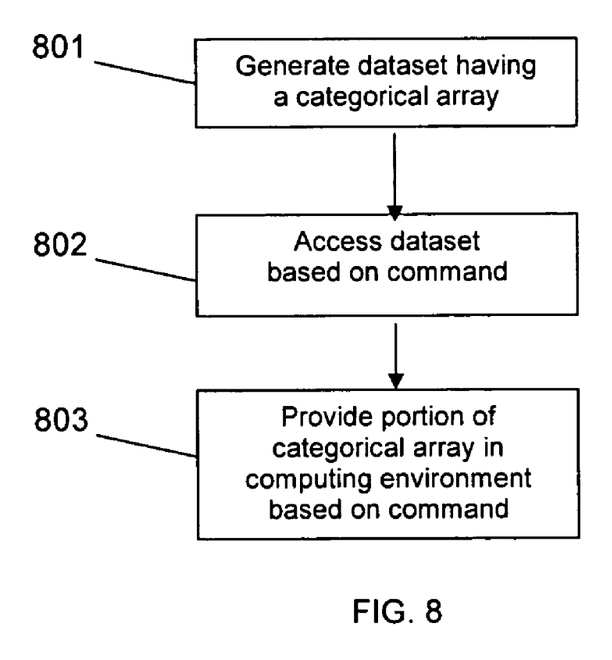
FIG. 8 depicts a flow chart for an exemplary embodiment of the invention.

FIG. 8 depicts a flow chart for an exemplary embodiment of the invention. In block 801, a dataset may be generated in the computing environment. The dataset may include a categorical array, and the categorical array may be internally represented in the computer environment as a finite set of K text strings and a vector of N indices with values from 1 to K indicating one of the K text strings.

In block 802, contents of the dataset may be accessed with a command in the computing environment.

In block 803, a portion of the categorical array may be provided in the computing environment based on the command. The provided portion of the categorical array may be some or all of the categorical array.

Figure 9:
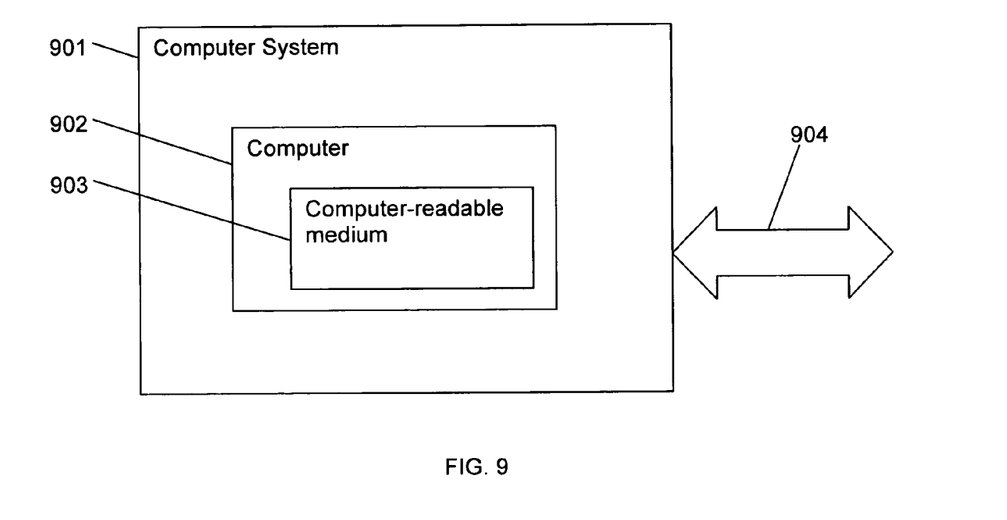
FIG. 9 depicts a computer system for an exemplary embodiment of the invention.

FIG. 9 depicts a computer system for an exemplary embodiment of the invention. The computer system 901 includes a computer 902 for implementing aspects of the exemplary embodiments described herein. The computer 902 includes a computer-readable medium 903 embodying software for implementing the invention and/or software to operate the computer 902 in accordance with the invention. As an option, the computer system 901 includes a connection to a network 904. With this option, the computer 902 is able to send and receive information (e.g., software, data, documents) from other computer systems via the network 904.

The present invention may be embodied in many different ways as a software component. For example, it may be a stand-alone software package, or it may be a software package incorporated as a "tool" in a larger software product, such as, for example, a mathematical analysis product or a statistical analysis product. It may be downloadable from a network, for example, a website, as a stand-alone product or as an add-in package for installation in an existing software application. It may also be available as a client-server software application, or as a web-enabled software application.

The examples and embodiments described herein are non-limiting examples.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method for a computing environment employing a matrix-based mathematical programming language, the method comprising:
  generating a heterogeneous dataset in the computing environment, where:
    the heterogeneous dataset having at least a first variable, a second variable, a plurality of subjects, and information relating to at least the first variable, the second variable, and the plurality of subjects,
    the first variable and the second variable embody a plurality of variables for the plurality of subjects,
    the information describes the plurality of variables and the plurality of subjects,
    each element of a respective variable has a same data type, the variables comprise at least two data types, and
the elements of the at least two data types being measured or collected data concerning the plurality of subjects;
accessing contents of the heterogeneous dataset with a single command in the computing environment, where:
the single command is based on at least one of:
a command to access contents of the heterogeneous dataset for one of the variables and for one of the subjects,
a command to access contents of the heterogeneous dataset for all subjects associated with one of the variables, or
a command to access contents of the heterogeneous dataset for a portion of the plurality of the variables and for a portion of the plurality of the subjects; and
providing in the computing environment a portion of the heterogeneous dataset based on the single command.

2. The method of claim 1, wherein the plurality of elements of the heterogeneous dataset are accessed based on at least two of: a command to access contents of the heterogeneous dataset for one of the variables and for one of the subjects, a command to access contents of the heterogeneous dataset for all subjects associated with one of the variables, or a command to access contents of the heterogeneous dataset for a portion of the plurality of the variables and for a portion of the plurality of the subjects.

3. The method of claim 1, wherein the plurality of elements of the heterogeneous dataset are accessed based on: a command to access contents of the heterogeneous dataset for one of the variables and for one of the subjects, a command to access contents of the heterogeneous dataset for all subjects associated with one of the variables, and a command to access contents of the heterogeneous dataset for a portion of the plurality of the variables and for a portion of the plurality of the subjects.

4. The method of claim 1, wherein the single command comprises a first argument to represent the heterogeneous dataset, a second argument to represent a selected one of the variables, a third argument to represent a selected one of the subjects, the second and third arguments enclosed in a pair of braces, and one of the braces located between the first argument and the second and third arguments.

5. The method of claim 1, wherein the single command comprises a first argument to represent the heterogeneous dataset, a second argument to represent a specific one of the variables, and a period located between the first argument and the second argument.

6. The method of claim 1, wherein the single command comprises a first argument to represent the heterogeneous dataset, a second argument to represent a specific portion of the plurality of the variables, a third argument to represent a specific portion of the plurality of the subjects, the second and third arguments enclosed in a pair of parentheses, and one of the parentheses located between the first argument and the second and third arguments.

7. The method of claim 1, wherein a first data type of the two data types is a logical array, a character array, a numeric array, a cell array, a categorical array, a time series object, an array of structures, an array of Java classes, an array of function handles, or an array created using an object-oriented class definition; and wherein a second data type of the two data types is different from the first data type.

8. The method of claim 1, wherein a first data type of the two data types is a non-numeric data type.

9. The method of claim 1, wherein the single command further assigns data to the heterogeneous dataset.

10. The method of claim 1, further comprising:
assigning subject names and variable names to the heterogeneous dataset.

11. The method of claim 1, wherein a first data type of the two data types is a categorical array.

12. The method of claim 11, wherein the categorical array is internally represented as a finite set of K text strings and a vector of N indices with values from 1 to K indicating one of the K text strings.

13. The method of claim 12, further comprising:
comparing all subjects for the variable with the categorical array data type to a text string using an equal operation or an unequal operation.

14. The method of claim 12, further comprising:
assigning an order to the finite set of K text strings of the categorical array.

15. The method of claim 14, further comprising:
comparing all subjects for the categorical array to a text string using a less than operation, a less than or equal to operation, a greater than operation, or a greater than or equal to operation.

16. The method of claim 1, wherein the heterogeneous dataset comprises information provided by a user via input to the computing environment, conducting one or more experiments in the computing environment, directing one or more experiments external to the computing environment; or accessing information external to the computing environment from one or more other computers via a network.

17. The method of claim 1, wherein the heterogeneous dataset represents measurements, statistical information, parameters, or information regarding one or more experiments.

18. A method for processing heterogeneous data comprising:
downloading software to a computer system, which when executed by the computer system causes the computer system to perform operations comprising the method of claim 1.

19. A method for processing heterogeneous data comprising:
providing software to download to a computer system, which when executed by the computer system causes the computer system to perform operations comprising the method of claim 1.

20. One or more non-transitory computer-readable media holding computer-executable instructions, the computer-executable instructions comprising one or more instructions for:
generating a heterogeneous dataset in the computing environment, where
the heterogeneous dataset having at least a first variable, a second variable, a plurality of subjects, and information relating to at least the first variable, the second variable, and the plurality of subjects,
the first variable and the second variable embody a plurality of variables for the plurality of subjects,
the information describes the plurality of variables and the plurality of subjects,
each element of a respective variable has a same data type,
the variables comprise at least two data types, and
the elements of the at least two data types being measured or collected data concerning the plurality of subjects;
accessing contents of the heterogeneous dataset with a single command in the computing environment, where the single command is based on at least one of:

a command to access contents of the heterogeneous dataset for one of the variables and for one of the subjects, a command to access contents of the heterogeneous dataset for all subjects associated with one of the variables, or a command to access contents of the heterogeneous dataset for a portion of the plurality of the variables and for a portion of the plurality of the subjects; and providing in the computing environment a portion of the heterogeneous dataset based on the single command.

21. The one or more non-transitory computer-readable media of claim 20, wherein the plurality of elements of the heterogeneous dataset are accessed based on at least two of: a command to access contents of the heterogeneous dataset for one of the variables and for one of the subjects, a command to access contents of the heterogeneous dataset for all subjects associated with one of the variables, or a command to access contents of the heterogeneous dataset for a portion of the plurality of the variables and for a portion of the plurality of the subjects.

22. The one or more non-transitory computer-readable media of claim 20, wherein the plurality of elements of the heterogeneous dataset are accessed based on: a command to access contents of the heterogeneous dataset for one of the variables and for one of the subjects, a command to access contents of the heterogeneous dataset for all subjects associated with one of the variables, and a command to access contents of the heterogeneous dataset for a portion of the plurality of the variables and for a portion of the plurality of the subjects.

23. The one or more non-transitory computer-readable media of claim 20, wherein the single command comprises a first argument to represent the heterogeneous dataset, a second argument to represent a selected one of the variables, a third argument to represent a selected one of the subjects, the second and third arguments enclosed in a pair of braces, and one of the braces located between the first argument and the second and third arguments.

24. The one or more non-transitory computer-readable media of claim 20, wherein the single command comprises a first argument to represent the heterogeneous dataset, a second argument to represent a specific one of the variables, and a period located between the first argument and the second argument.

25. The one or more non-transitory computer-readable media of claim 20, wherein the single command comprises a first argument to represent the heterogeneous dataset, a second argument to represent a specific portion of the plurality of the variables, a third argument to represent a specific portion of the plurality of the subjects, the second and third arguments enclosed in a pair of parentheses, and one of the parentheses located between the first argument and the second and third arguments.

26. The one or more non-transitory computer-readable media of claim 20, wherein a first data type of the two data types is a logical array, a character array, a numeric array, a cell array, a categorical array, a time series object, an array of structures, an array of java classes, an array of function handles, or an array created using an object-oriented class definition; and wherein a second data type of the two data types is different from the first data type.

27. The one or more non-transitory computer-readable media of claim 20, wherein a first data type of the two data types is a non-numeric data type.

28. The one or more non-transitory computer-readable media of claim 20, wherein the single command further assigns data to the heterogeneous dataset.

29. The one or more non-transitory computer-readable media of claim 20, the operations further comprising:

assigning subject names and variable names to the heterogeneous dataset.

30. The one or more non-transitory computer-readable media of claim 20, wherein a first data type of the two data types is a categorical array.

31. The one or more non-transitory computer-readable media of claim 30, wherein the categorical array is internally represented as a finite set of K text strings and a vector of N indices with values from 1 to K indicating one of the K text strings.

32. The one or more non-transitory computer-readable media of claim 30, the operations further comprising:

comparing all subjects for the variable with the categorical array data type to a text string using an equal operation or an unequal operation.

33. The one or more non-transitory computer-readable media of claim 30, the operations further comprising:

assigning an order to the finite set of K text strings of the categorical array.

34. The one or more non-transitory computer-readable media of claim 33, the operations further comprising:

comparing all subjects for the categorical array to a text string using a less than operation, a less than or equal to operation, a greater than operation, or a greater than or equal to operation.

35. The one or more non-transitory computer-readable media of claim 20, wherein the heterogeneous dataset comprises information provided by a user via input to the computing environment, conducting one or more experiments in the computing environment, directing one or more experiments external to the computing environment; or accessing information external to the computing environment from one or more other computers via a network.

36. The one or more non-transitory computer-readable media of claim 20, wherein the heterogeneous dataset represents measurements, statistical information, parameters, or information regarding one or more experiments.

37. A computer-based system for processing heterogeneous data in a computing environment employing a matrix-based mathematical programming language, comprising:

means for generating, using a processor, a heterogeneous dataset in the computing environment, where the heterogeneous dataset having at least a first variable, a second variable, a plurality of subjects, and information relating to at least the first variable, the second variable, and the plurality of subjects, the first variable and the second variable embody a plurality of variables for the plurality of subjects, the information describes the plurality of variables and the plurality of subjects, each element of a respective variable has a same data type, and the variables comprise at least two data types, and the elements of the at least two data types being measured or collected data concerning the plurality of subjects;

means for accessing contents of the heterogeneous dataset with a single command in the computing environment, where
the single command is based on at least one of:
a command to access contents of the heterogeneous dataset for one of the variables and for one of the subjects,
a command to access contents of the heterogeneous dataset for all subjects associated with one of the variables, or
a command to access contents of the heterogeneous dataset for a portion of the plurality of the variables and for a portion of the plurality of the subjects; and
means for providing in the computing environment a portion of the heterogeneous dataset based on the single command.

38. A computer-implemented method for a computing environment employing a matrix-based mathematical programming language, the method comprising:
generating a heterogeneous dataset in the computing environment, wherein the heterogeneous dataset embodies a plurality of variables for a plurality of subjects, wherein each element of a respective variable has a same data type, wherein the variables comprise at least two data types;
accessing contents of the heterogeneous dataset with a single command in the computing environment, wherein the single command is based on at least one of: a command to access contents of the heterogeneous dataset for one of the variables and for one of the subjects, a command to access contents of the heterogeneous dataset for all subjects associated with one of the variables, or a command to access contents of the heterogeneous dataset for a portion of the plurality of the variables and for a portion of the plurality of the subjects; and
providing in the computing environment a portion of the heterogeneous dataset based on the single command;
wherein the single command based on the command to access contents of the heterogeneous dataset for one of the variables and for one of the subjects comprises a first argument to represent the heterogeneous dataset, a second argument to represent a selected one of the variables, a third argument to represent a selected one of the subjects, the second and third arguments enclosed in a pair of braces, and one of the braces located between the first argument and the second and third arguments;
wherein the single command based on the command to access contents of the heterogeneous dataset for all subjects associated with one of the variable comprises a fourth argument to represent the heterogeneous dataset, a fifth argument to represent a specific one of the variables, and a period located between the fourth argument and the fifth argument;
wherein the single command based on the command to access contents of the heterogeneous dataset for a portion of the plurality of the variables and for a portion of the plurality of the subject comprises a sixth argument to represent the heterogeneous dataset, a seventh argument to represent a specific portion of the plurality of the variables, an eighth argument to represent a specific portion of the plurality of the subjects, the seventh and eighth arguments enclosed in a pair of parentheses, and one of the parentheses located between the sixth argument and the seventh and eighth arguments.

39. A computer-readable medium comprising software, which when executed by a computer system causes the computer system to perform operations in a computing environment employing a matrix-based mathematical programming language, the operations comprising:
generating a heterogeneous dataset in the computing environment, wherein the heterogeneous dataset embodies a plurality of variables for a plurality of subjects, wherein each element of a respective variable has a same data type, wherein the variables comprise at least two data types;
accessing contents of the heterogeneous dataset with a single command in the computing environment, wherein the single command is based on at least one of: a command to access contents of the heterogeneous dataset for one of the variables and for one of the subjects, a command to access contents of the heterogeneous dataset for all subjects associated with one of the variables, or a command to access contents of the heterogeneous dataset for a portion of the plurality of the variables and for a portion of the plurality of the subjects; and
providing in the computing environment a portion of the heterogeneous dataset based on the single command;
wherein the single command based on the command to access contents of the heterogeneous dataset for one of the variables and for one of the subjects comprises a first argument to represent the heterogeneous dataset, a second argument to represent a selected one of the variables, a third argument to represent a selected one of the subjects, the second and third arguments enclosed in a pair of braces, and one of the braces located between the first argument and the second and third arguments;
wherein the single command based on the command to access contents of the heterogeneous dataset for all subjects associated with one of the variable comprises a fourth argument to represent the heterogeneous dataset, a fifth argument to represent a specific one of the variables, and a period located between the fourth argument and the fifth argument;
wherein the single command based on the command to access contents of the heterogeneous dataset for a portion of the plurality of the variables and for a portion of the plurality of the subject comprises a sixth argument to represent the heterogeneous dataset, a seventh argument to represent a specific portion of the plurality of the variables, an eighth argument to represent a specific portion of the plurality of the subjects, the seventh and eighth arguments enclosed in a pair of parentheses, and one of the parentheses located between the sixth argument and the seventh and eighth arguments.

40. A computer-based system for processing heterogeneous data in a computing environment employing a matrix-based mathematical programming language, comprising:
means for generating, using a processor, a heterogeneous dataset in the computing environment, wherein the heterogeneous dataset embodies a plurality of variables for a plurality of subjects, wherein each element of a respective variable has a same data type, wherein the variables comprise at least two data types;
means for accessing contents of the heterogeneous dataset with a single command in the computing environment, wherein the single command is based on at least one of:
a command to access contents of the heterogeneous dataset for one of the variables and for one of the subjects, a command to access contents of the heterogeneous dataset for all subjects associated with one of the variables, or a command to access contents of the heterogeneous dataset for a portion of the plurality of the variables and for a portion of the plurality of the subjects; and means for providing in the computing environment a portion of the heterogeneous dataset based on the single command;

wherein the single command based on the command to access contents of the heterogeneous dataset for one of the variables and for one of the subjects comprises a first argument to represent the heterogeneous dataset, a second argument to represent a selected one of the variables, a third argument to represent a selected one of the subjects, the second and third arguments enclosed in a pair of braces, and one of the braces located between the first argument and the second and third arguments;

wherein the single command based on the command to access contents of the heterogeneous dataset for all subjects associated with one of the variable comprises a fourth argument to represent the heterogeneous dataset, a fifth argument to represent a specific one of the variables, and a period located between the fourth argument and the fifth argument;

wherein the single command based on the command to access contents of the heterogeneous dataset for a portion of the plurality of the variables and for a portion of the plurality of the subject comprises a sixth argument to represent the heterogeneous dataset, a seventh argument to represent a specific portion of the plurality of the variables, an eighth argument to represent a specific portion of the plurality of the subjects, the seventh and eighth arguments enclosed in a pair of parentheses, and one of the parentheses located between the sixth argument and the seventh and eighth arguments.

41. A computer-implemented method for a computing environment employing a matrix-based mathematical programming language, the method comprising:

generating a heterogeneous dataset in the computing environment, where
the heterogeneous dataset has at least a first variable, a second variable, a plurality of subjects, and information relating to at least the first variable, the second variable, and the plurality of subjects,
the heterogeneous dataset embodies a plurality of categories for the plurality of subjects,
the heterogeneous dataset comprises a categorical array,
the categorical array comprises the categories for the plurality of subjects, and
the categorical array is internally represented in the computing environment as a finite set of K text strings and a vector of N indices from 1 to K indicating the value of each respective subject;

accessing contents of the dataset with a command in the computing environment; and providing in the computing environment a portion of the categorical array based on the command.

42. The method of claim 41, further comprising:
comparing the categorical array to a text string using an equal operation or an unequal operation.

43. The method of claim 41, further comprising:
assigning an order to the finite set of K text strings of the categorical array.

44. The method of claim 43, further comprising:
comparing the categorical array to a text string using a less than operation, a less than or equal to operation, a greater than operation, or a greater than or equal to operation.

45. A method for processing data comprising:
downloading software to a computer system, which when executed by the computer system causes the computer system to perform operations comprising the method of claim 41.

46. A method for processing heterogeneous data comprising:
providing software to download to a computer system, which when executed by the computer system causes the computer system to perform operations comprising the method of claim 41.

47. One or more non-transitory computer-readable media holding computer-executable instructions, the computer-executable instructions comprising one or more instructions for:
generating a heterogeneous dataset in the computing environment, where
the heterogeneous dataset has at least a first variable, a second variable, a plurality of subjects, and information relating to at least the first variable, the second variable, and the plurality of subjects,
the heterogeneous dataset embodies a plurality of categories for the plurality of subjects,
the heterogeneous dataset comprises a categorical array, and
the categorical array is internally represented in the computing environment as a finite set of K text strings and a vector of N indices with values from 1 to K indicating the value of each respective subject;
accessing contents of the dataset with a command in the computing environment; and
providing in the computing environment a portion of the categorical array based on the command.

48. The one or more non-transitory computer-readable media of claim 47, the operations further comprising:
comparing the categorical array to a text string using an equal operation or an unequal operation.

49. The one or more non-transitory computer-readable media of claim 47, the operations further comprising:
assigning an order to the finite set of K text strings of the categorical array.

50. The one or more non-transitory computer-readable media of claim 49, the operations further comprising:
comparing the categorical array to a text string using a less than operation, a less than or equal to operation, a greater than operation, or a greater than or equal to operation.

* * * * *

UNITED STATES PATENT AND TRADEMARK OFFICE
CERTIFICATE OF CORRECTION

| | | |
|---|---|---|
| PATENT NO. | : 8,185,556 B2 | Page 1 of 1 |
| APPLICATION NO. | : 11/518151 | |
| DATED | : May 22, 2012 | |
| INVENTOR(S) | : Perkins et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1597 days.

Signed and Sealed this
Thirteenth Day of October, 2015

Michelle K. Lee
*Director of the United States Patent and Trademark Office*